(12) United States Patent
    Bomleny et al.

(10) Patent No.: US 12,582,036 B2
(45) Date of Patent: Mar. 24, 2026

(54) DECK PLATE AUTOMATIC ADJUSTMENT SYSTEM AND METHOD

(71) Applicant: DEERE & COMPANY, Moline, IL (US)

(72) Inventors: Duane M. Bomleny, Geneseo, IL (US); Thomas J. Spielman, Davenport, IA (US)

(73) Assignee: Deere & Company, Moline, IL (US)

( * ) Notice: Subject to any disclaimer, the term of this patent is extended or adjusted under 35 U.S.C. 154(b) by 626 days.

(21) Appl. No.: 17/972,006

(22) Filed: Oct. 24, 2022

(65) Prior Publication Data

US 2024/0130279 A1    Apr. 25, 2024
US 2024/0224855 A9    Jul. 11, 2024

(51) Int. Cl.
    *A01D 41/127*        (2006.01)
    *A01D 41/14*         (2006.01)
    *A01D 45/02*         (2006.01)

(52) U.S. Cl.
    CPC ......... *A01D 41/127* (2013.01); *A01D 41/141* (2013.01); *A01D 45/021* (2013.01); *A01D 45/028* (2013.01)

(58) Field of Classification Search
    CPC .. A01D 41/127; A01D 41/141; A01D 45/021; A01D 45/028
    See application file for complete search history.

(56) References Cited

U.S. PATENT DOCUMENTS 2,716,321 A      8/1955  Schaaf et al.
6,119,531 A  *  9/2000  Wendte ................ A01D 41/127
                                            73/863.52

8,073,235 B2    12/2011  Hausmann et al.
8,488,865 B2     7/2013  Hausmann et al.
9,282,693 B2     3/2016  Anderson
9,335,313 B2     5/2016  Li et al.
                (Continued)

FOREIGN PATENT DOCUMENTS

EP          3058803 A1      8/2016
EP          3072380 A1  *   9/2016    ........... A01D 45/021
WO      WO2019129333 A1     7/2019

OTHER PUBLICATIONS

R. Makanza, High-throughput method for ear phenotyping and kernel weight estimation in maize using ear digital imaging, dated Jun. 15, 2018, pp. 1-13, [online]. Retrieved from the internet <URL: https://plantmethods.biomedcentral.com/articles/10.1186/s13007-018-0317-4>.

(Continued)

*Primary Examiner* — Claude J Brown

(74) *Attorney, Agent, or Firm* — Taft Stettinius & Hollister LLP; Stephen F. Rost

(57)                    ABSTRACT

A row unit of a corn header includes a first deck plate, a second deck plate, and a gap between the first and second deck plates. A position of one or both of the deck plates may be adjusted by a linkage assembly including at least one arm pivotably coupled, at a first end, to one or both of the deck plates and, at a second end, to an actuator. The actuator may be controlled by a controller to move one or both of the deck plates based on signals received from an ear size sensor such as a camera that measures various parameters of corn and also based on a kernel depth of the type of corn to be harvested.

18 Claims, 7 Drawing Sheets

(56) References Cited

U.S. PATENT DOCUMENTS

| | | | |
|---|---|---|---|
| 10,019,791 B2 | 7/2018 | Young et al. | |
| 10,438,302 B2 | 10/2019 | Bedoya et al. | |
| 10,713,768 B2 | 7/2020 | Berghoefer et al. | |
| 11,240,959 B2 | 2/2022 | Borgstadt | |
| 11,470,766 B2 | 10/2022 | King et al. | |
| 11,483,972 B2 | 11/2022 | Dima et al. | |
| 2008/0261669 A1* | 10/2008 | Neidigh | A01F 11/06 |
| | | | 460/48 |
| 2014/0023243 A1 | 1/2014 | Nagaraj et al. | |
| 2016/0084987 A1 | 3/2016 | Dybro et al. | |
| 2016/0113199 A1* | 4/2016 | Jongmans | A01D 41/1273 |
| | | | 56/10.2 R |
| 2016/0174461 A1* | 6/2016 | Walker | A01D 45/021 |
| | | | 56/119 |
| 2017/0024876 A1 | 1/2017 | Young et al. | |
| 2017/0112057 A1 | 4/2017 | Loukili et al. | |
| 2017/0206415 A1 | 7/2017 | Redden | |
| 2019/0019281 A1 | 1/2019 | Berghoefer et al. | |
| 2019/0066234 A1 | 2/2019 | Bedoya et al. | |
| 2020/0072809 A1 | 3/2020 | Bhanu et al. | |
| 2020/0221635 A1 | 7/2020 | Hendrickson et al. | |
| 2021/0015045 A1 | 1/2021 | Vandike et al. | |
| 2021/0029877 A1 | 2/2021 | Vandike et al. | |
| 2022/0110238 A1 | 4/2022 | Vandike et al. | |

OTHER PUBLICATIONS

Fernando Perez-Sanz, Plant phenomics: an overview of image acquisition technologies and image data analysis algorithms, dated Oct. 3, 2017, pp. 1-35, doi: 10.1093/gigascience/gix092, [online]. Retrieved from the internet <URL: https://www.ncbi.nlm.nih.gov/pmc/articles/PMC5737281/>.

Nathan D. Miller, A robust, high-throughput method for computing maize ear, cob, and kernel attributes automatically from images, dated Nov. 19, 2016, pp. 169-178, doi: 10.1111/tpj.13320, [online]. Retrieved from the internet <URL: https://onlinelibrary.wiley.com/doi/full/10.1111/tpj.13320>.

Omni-line Orientors—Bottle Orienting Machine, Youtube Videos, dated Jan. 14, 2019, [online]. Retrieved from the internet <URL: https://www.bing.com/videos/search?q=orienting+bottles&&view=detail&mid=CC05D923BF6B2E432C7DCC05D923BF6B2E432C7D&&FORM=VRDGAR&ru=%2Fvideos%2Fsearch%3Fq%3Dorienting%2520bottles%26qs%3Dn%26form%3DQBVR%26sp%3D-1% 26pq%3Dorienting%2520bottles%26sc%3D1-17%26sk%3D% 26cvid%3D4AD701805BA04BC5898EA71A42849C05>.

Maize Kernel-Ear-Cob Analysis, pp. 1-3, [online]. Retrieved from the internet <URL: http://www.plant-image-analysis.org/software/maize-kernel-ear-cob-analysis>.

Cecilia Di Ruberto, Generalized Hough Transform for Shape Matching, International Journal of Computer Applications (0975-8887), dated Jun. 2012, pp. 19-22, DOI:10.5120/7312-9885, [online]. Retrieved from the internet <URL: https://pdfs.semanticscholar.org/9066/a8bd2d4dea87897401bee57b6955d6681688.pdf>.

Ignacio Ciampitti, Kansas Soybeans: Conditions Before Harvest—Pod Shattering, dated Oct. 17, 2018, pp. 1-5, [online]. Retrieved from the internet <URL: https://agfax.com/2018/10/17/kansas-soybeans-conditions-before-harvest-pod-shattering/>.

Tracy Frank, ND native's idea for improved corn husking leads to creation of major company, dated Sep. 26, 2014, pp. 1-9, [online]. Retrieved from the internet <URL: https://www.inforum.com/business/3566757-nd-natives-idea-improved-corn-husking-leads-creation-major-company>.

Michael P. Pound, Deep machine learning provides state-of-the-art performance in image-based plant phenotyping, dated Aug. 23, 2017, pp. 1-18, doi: 10.1093/gigascience/gix083, [online]. Retrieved from the internet <URL: https://www.ncbi.nlm.nih.gov/pmc/articles/PMC5632296/>.

Jinglei Zhang, Research on Energy Saving Routing Algorithm of Cluster Wireless Sensor Networks, 3rd International Conference on Electromechanical Control Technology and Transportation (ICECTT 2018), pp. 492-497, ISBN: 978-989-758-312-4, [online]. Retrieved from the internet <URL: http://www.scitepress.org/Papers/2018/69727/69727.pdf>.

Video A&K Seed Corn Husker, Youtube Videos, dated Nov. 12, 2014, [online]. Retrieved from the internet <URL: https://www.youtube.com/watch?v=dqi21MxkctU>.

Hughes Sweet Corn Husker, Youtube Videos, dated Jan. 5, 2009, [online]. Retrieved from the internet <URL: https://www.youtube.com/watch?v =-I9z9fqan9U>.

Sweet Corn Husker Machine, [online]. Retrieved from the internet <URL: https://www.amisyfoodmachine.com/food-machinery/fresh-corn-husker-machine.html>.

Real Time Ellipse Detection on Mobile Devices, Youtube Videos, dated Jul. 16, 2013, [online]. Retrieved from the internet <URL: https://www.youtube.com/watch?v=PYUjs-K01Ss>.

2D Bounded Hough Transform-Face Tracking, Youtube Videos, dated Jan. 18, 2008, [online]. Retrieved from the internet <URL: https://www.youtube.com/watch?v=ONeGFmu1WM8>.

\* cited by examiner

DECK PLATE AUTOMATIC ADJUSTMENT SYSTEM AND METHOD

FIELD OF THE DISCLOSURE

The present disclosure relates to automatic adjustment of components of a combine harvester, and more particularly to systems and methods for automatically adjusting deck plates of a combine harvester based on characteristics associated with crops.

BACKGROUND

Agricultural machines, such as combine harvesters, include different portions or sections for cutting and processing crops. A corn header for a combine harvester is arranged to be moved in a forward direction over a field. The corn header comprises a laterally extending frame supporting a separating mechanism to separate a crop, such as corn, from a stalk. The separating mechanism is configured to either cut the crop or to break the crop from the stalk to collect the crop. The separated crop is collected and delivered to a collector, such as a wagon, for delivery of the crop to a consumer.

A corn header includes a number of crop dividers defining a gaps to direct stalks of corn to a row unit. The row unit includes a gathering chain, deck plates, and stalk rolls configured to separate corn ears from the stalk. The separated corn ears are supported by the deck plates, which are separated by an adjustable gap. The corn ears are moved by the gathering chain to a floor of the header. An auger located above the floor moves the corn ears to a location for collection.

Because the gap of the deck plate is often adjusted prior to separating the corn ear from the stalk, the gap can be too large or too small, which reduces harvesting yield per acre. If the gap is far too large, small ears of corn can fall through the gap and are lost. If the gap is moderately larger than ideal, butt shelling occurs; this is because the gap is not large enough to allow the whole ear to pass through the gap, in which case the tips of the kernels of corn strike the deck plate edges dislodging the kernels from the cob upon impact with the deck plate. If the gap is moderately more narrow than ideal, excessive material such as leaves from the stalk, and other debris, such as weeds, are collected by the corn header, which when accumulated, wrap on the auger and prevent the corn ears from being effectively moved by the auger to the collection location. This can also result in reduced capacity of the combine harvester, decreased fuel efficiency, and increased wear and maintenance costs. When the gap is severely smaller than ideal, plugging of stalks and material can occur in the row unit and intake of subsequent crop is impeded.

What is needed therefore is a corn header that mitigates reduced harvesting yields resulting from the gap being set too wide or too narrow for a field of corn.

SUMMARY

In an illustrative embodiment, a combine harvester comprises a corn header. The corn header comprises: a frame; a first crop row divider coupled to the frame; a second crop row divider coupled to the frame and spaced from the first crop row divider to define a space therebetween; and a row unit positioned at the space. The row unit includes: a first deck plate fixed relative to the frame, a second deck plate spaced apart from and movable relative to the first deck plate, a gap defined between the first deck plate and the second deck plate, at least one arm coupled to the second deck plate, and an actuator coupled to the at least one arm. The combine harvester further includes: an ear size sensor positioned on the combine harvester and configured to measure a diameter of at least one ear of corn during a harvesting operation; and a controller operatively coupled to the ear size sensor and the actuator, wherein the controller is configured to: receive a signal from the ear size sensor indicative of a diameter of at least one ear of corn; and adjust the position of the actuator based on: (i) the signal from the ear size sensor indicative of a diameter of at least one ear of corn and (ii) a kernel depth of the corn.

In some embodiments, the controller includes a memory having stored thereon relationships between types of corn and kernel depths thereof. In some embodiments, the controller is configured to: determine a reduction value based on at least the identified kernel depth; and determine a desired length for the gap which is equal to the diameter of the at least one ear of corn less the reduction value. In some embodiments, the controller is configured to: adjust the position of the actuator until the gap between the deck plates is equal to the desired length for the gap. In some embodiments, the controller is configured to: receive a signal from the ear size sensor indicative of a diameter of at least one stalk of corn; compare the desired length for the gap to the diameter of the at least one stalk of corn; and adjust the position of the actuator such that the gap between deck plates is equal to the measured diameter of the at least one stalk of corn if the desired length for the gap is less than the diameter of the at least one stalk of corn. In some embodiments, the ear size sensor is a camera.

In some embodiments, the at least one arm is pivotably coupled to the second deck plate. In some embodiments, the actuator is a linear actuator including a piston and a cylinder; and a first one of the piston and the cylinder is fixed relative to the frame and a second one of the piston and the cylinder is movable relative to the frame and coupled to the at least one arm.

In another illustrative embodiment, a combine harvester comprises a row unit of a corn header including: a first deck plate, a second deck plate movable relative to the first deck plate, and a gap defined between the first deck plate and the second deck plate. The combine harvester further includes: an actuator coupled to the second deck plate to cause movement thereof; an ear size sensor positioned on the combine harvester and configured to measure a diameter of at least one ear of corn during a harvesting operation; and a controller operatively coupled to the ear size sensor and the actuator, wherein the controller is configured to: receive a signal from the ear size sensor indicative of a diameter of at least one ear of corn; and adjust the position of the actuator based on: (i) the signal from the ear size sensor indicative of a diameter of at least one ear of corn and (ii) a kernel depth of the corn.

In some embodiments, the controller includes a memory having stored thereon relationships between types of corn for harvesting and kernel depths thereof. In some embodiments, the combine harvester includes a user interface operatively coupled to the controller; and the controller is configured to receive a signal from the user interface indicative of the type of corn.

In some embodiments, the controller is configured to: receive a signal from the ear size sensor indicative of a diameter of at least one stalk of corn; and adjust the position of the actuator based on: (i) the signal from the ear size sensor indicative of a diameter of the at least one ear of corn, (ii) the kernel depth of the corn, and (iii) the signal from the ear size sensor indicative of a diameter of the at least one stalk of corn.

In another illustrative embodiment, a method of automatically adjusting a gap between deck plates of a combine harvester comprises: measuring, with an ear size sensor mounted on the combine harvester, the diameter of at least one ear of corn; identifying a kernel depth that corresponds to the kernel of the at least one ear of corn; determining a reduction value based on at least the identified kernel depth; determining a desired gap length equal to the diameter of the at least one ear of corn less the reduction value; and adjusting the position of at least one deck plate of the combine harvester such that the gap between the deck plates is equal to the desired gap length.

In some embodiments, the reduction value is no more than twice the kernel depth. In some embodiments, the reduction value is twice the kernel depth. In some embodiments, the ear size sensor is a camera. In some embodiments, identifying a kernel depth that corresponds to the kernel of the at least one ear of corn includes: identifying the kernel depth based on stored relationships between types of corn for harvesting and kernel depths thereof.

In some embodiments, the method of automatically adjusting a gap between deck plates of a combine harvester further comprises: receiving an adjustment input from a user interface, wherein the adjustment input indicates: (i) an adjustment value and (ii) that the gap between the deck plates is too wide or too narrow. In some embodiments, determining a reduction value based on at least the identified kernel depth includes: multiplying the identified kernel depth by a factor of two; and adding the adjustment value to the kernel depth multiplied by a factor of two if the received adjustment input indicates that the gap between the deck plates is too wide. In some embodiments, determining a reduction value based on at least the identified kernel depth includes: multiplying the identified kernel depth by a factor of two; and reducing the kernel depth multiplied by a factor of two by the adjustment value if the received adjustment input indicates that the gap between the deck plates is too narrow. In some embodiments, the adjustment value is a predetermined value based on the type of corn.

In some embodiments, the method of automatically adjusting a gap between deck plates of a combine harvester further comprises: measuring the diameter of at least one corn stalk; comparing the desired gap length to the diameter of the at least one corn stalk; and adjusting the position of at least one deck plate of the combine harvester such that the gap between deck plates is equal to the measured diameter of the at least one corn stalk if the desired gap length is less than the diameter of the at least one corn stalk.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
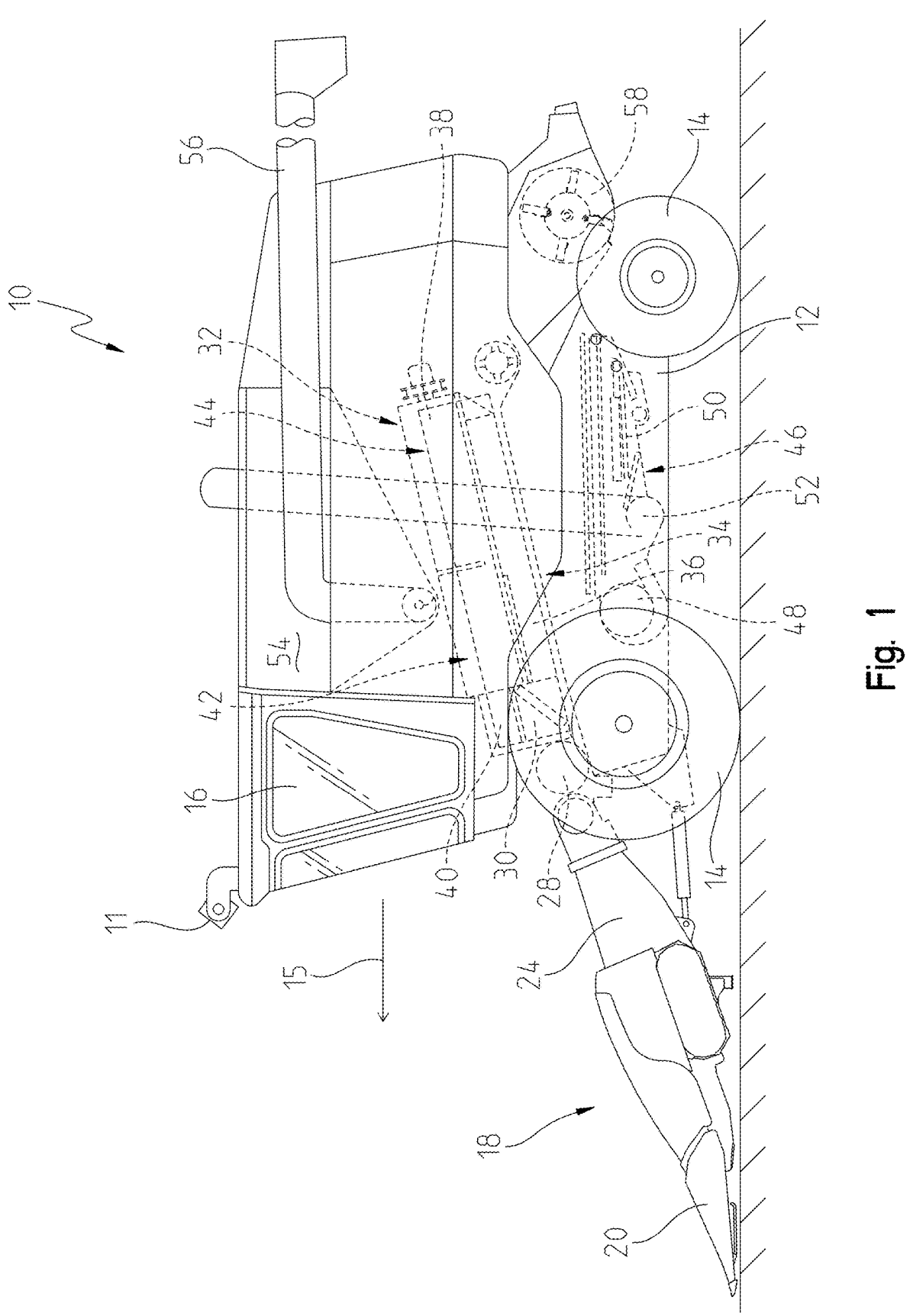
FIG. 1 illustrates a side view of a combine harvester including an ear size sensor mounted thereon, which is configured to measure characteristics of corn.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

FIG. 1 illustrates an embodiment of an agricultural machine, i.e., a combine harvester 10, including a chassis 12 and ground engaging mechanisms (e.g., wheels 14) in contact with the ground. The wheels 14 are coupled to the chassis 12 and are used for propulsion of the combine harvester 10 in a forward operating or travelling direction 15. The operation of the combine harvester 10 is controlled from an operator's cab 16. The operator's cab 16, in some embodiments, includes one or more controls (e.g., including a user interface 105) for controlling the operation of the combine harvester 10. The combine harvester 10 further includes a corn header 18 disposed at a forward end of the combine harvester 10. The corn header 18 includes a plurality of crop row dividers 20 to direct stalks of corn into the corn header 18 and to separate corn ears from the stalks. The corn ears are directed by a crop auger assembly 22 (see FIG. 2) and directed by a slope conveyor 24 toward a guide drum 28 which directs the corn ears to an inlet transition section 30. The inlet transition section 30 directs the cut crop to an harvested crop processing arrangement 32.

The harvested crop processing arrangement 32 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the harvested crop processing arrangement 32. A threshing section 42 and a separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the harvested crop processing unit 32. In place of the harvested crop processing unit 32, a tangential threshing drum with a following threshing section or a straw chopper can also be used.

Corn and chaff that fall through a thresher basket associated with the threshing section 42 and through a separating grate associated with the separating section 44 may be directed to a cleaning system 46 with a blower 48 and sieves 50 with louvers. The sieves 50 can be oscillated in a fore-and-aft direction. The cleaning system 46 removes the chaff and guides the clean corn over a screw conveyor 52 to an elevator for clean corn. The elevator for clean corn deposits the clean corn in a corn tank 54. The clean corn in the corn tank 54 can be unloaded by means of an unloading screw conveyor 56 to a corn wagon, trailer, or truck. Harvested crop remaining at the lower end of the sieve 50 is again transported to the harvested crop processing arrangement 32 by an overhead conveyor. The harvested crop residue delivered at the upper end of the sieve 50 that consists essentially of chaff and small straw particles may be conveyed by means of an oscillating sheet conveyor to a chopper rotor assembly 58.

Figure 2:
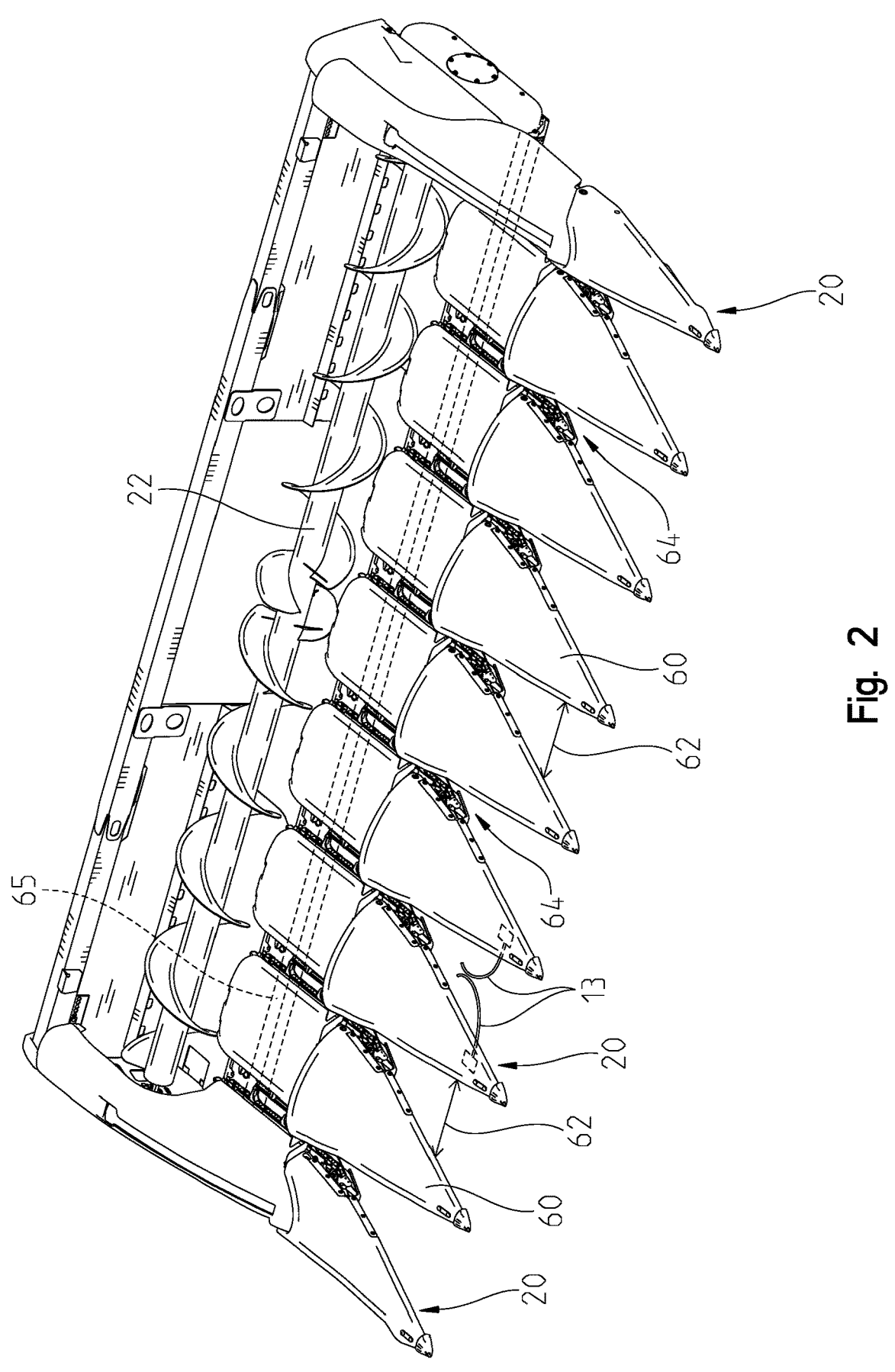
FIG. 2 illustrates a perspective view of a corn header of the combine harvester.

As further illustrated in FIG. 2, the corn header 18 includes a plurality of crop row dividers 20 and the crop auger assembly 22 each coupled to a frame 65. Each of the crop row dividers 20 includes a cone-shaped nose 60, wherein a space 62 is defined between adjacent noses 60. The space 62 is generally aligned with a corn row by the operator or by an automatic guidance system that directs the combine harvester 10 along a row of corn. As the combine harvester 10 moves forward, the corn stalks are directed to a deck assembly 64, also identified as a row unit, which is also illustrated in FIGS. 3 and 4.

Figure 3:
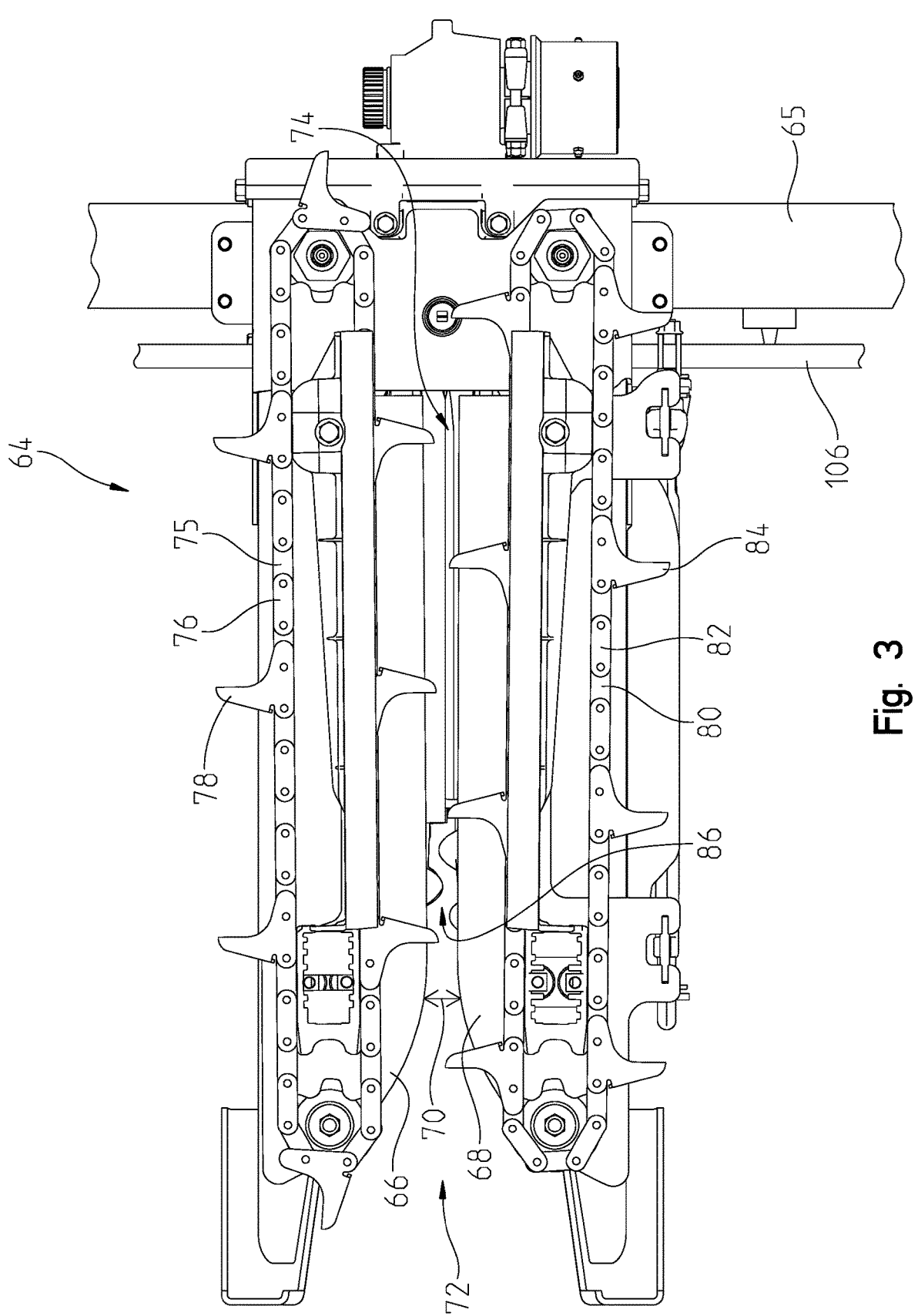
FIG. 3 illustrates a top-down view of a deck assembly of the corn header showing a gap between deck plates of the deck assembly, which may be automatically adjusted based on a closed loop control system during operation of the combine harvester.

As shown in FIG. 3, the deck assembly 64 includes a first deck plate 66 and a second deck plate 68 spaced from the first deck plate 66 by a gap 70. The corn stalks enter the space 62 and are directed by the adjacent noses 60 into the gap 70. The gap 70 extends from a first end or front 72 to a second end or rear 74 of the deck assembly 64. The gap 70 is adjustable as later described herein.

A first gathering chain assembly 75 is disposed above the first deck plate 66 and includes a plurality of links 76, some of which include paddles 78. A second gathering chain assembly 80 is disposed above the second deck plate 68 and includes a plurality of links 82, some of which are paddles 84. As the stalks move through the gap 70 from the first end 72 to the second end 74, a stalk roll assembly 86 captures the stalk and pulls each stalk toward the ground. As shown in FIG. 4, the stalk roll assembly 86 includes counter rotating stalk rolls 87. The corn stalk is pulled downward toward the first deck plate 66 and the second deck plate 68, whereupon a corn ear makes contact with one or both of the deck plates 66 and 68 as the corn ear is separated from the stalk.

Figure 4:
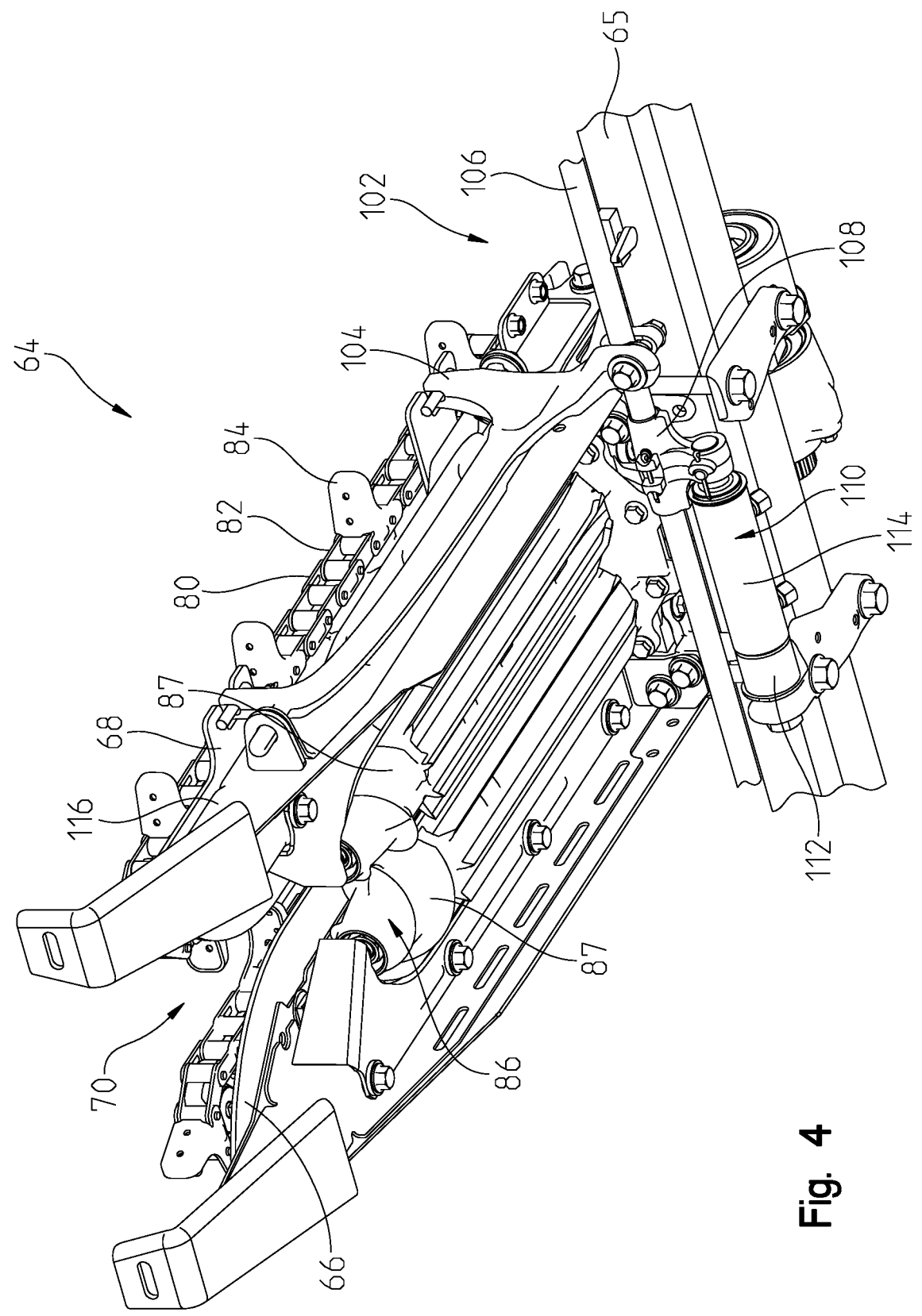
FIG. 4 illustrates a bottom-up perspective view of a portion of the deck assembly of FIG. 3.

As shown in FIG. 4, in some embodiments, the deck assembly 64 includes a linkage assembly 102 coupled to one or both of the first deck plate 66 and the second deck plate 68. In the illustrative embodiment, the linkage assembly 102 is pivotably coupled to the second deck plate 68 at the lateral edge of the second deck plate 68 that is positioned opposite the first deck plate 66. In the illustrative embodiment, the linkage assembly 102 includes a rocker 104 directly and pivotably coupled to the second deck plate 68, a rod 106 directly coupled to the rocker 104, and a bracket 108 directly coupled to the rod 106. It should be appreciated that any of the rocker 104, the rod 106, and the bracket 108 may be referred to as an arm of the linkage assembly 102. In the illustrative embodiment, the deck assembly 64 further includes an actuator 110. In the illustrative embodiment, the actuator 110 is directly coupled to the bracket 108 and configured to cause movement thereof. In other embodiments, various arrangements may be used to move one or both deck plates 66, 68 relative to each other to vary the length of the gap between the deck plates 66, 68.

Figure 5:
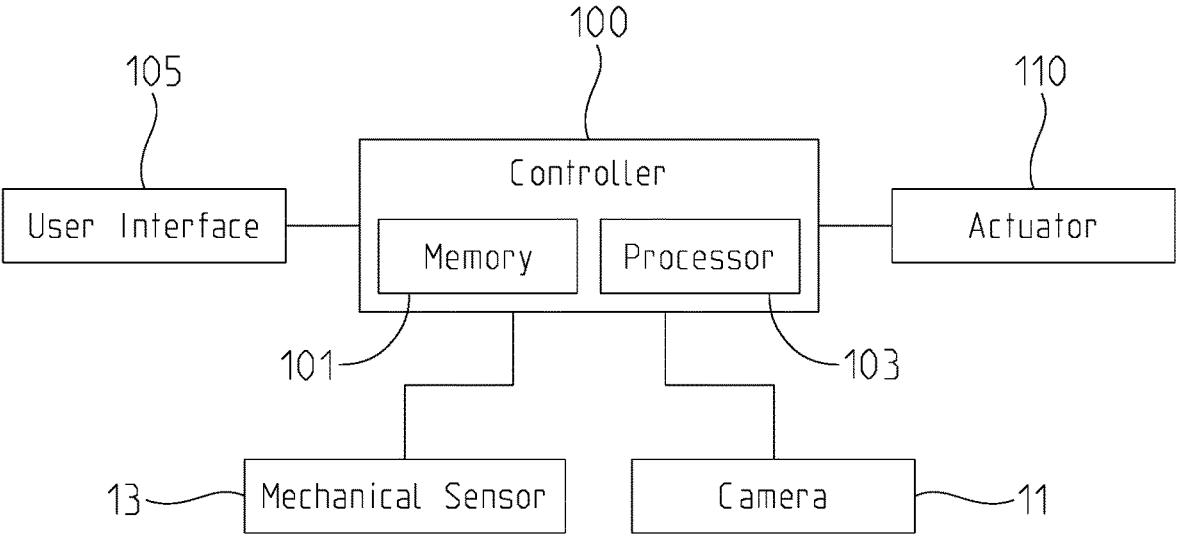
FIG. 5 illustrates a diagram of the closed loop control system for the combine harvester including a controller, a user interface and am ear size sensor for providing inputs to the controller, and an actuator for receiving outputs from the controller.

In the illustrative embodiment, the actuator 110 is operatively coupled to a controller 100, as shown in FIG. 5. The controller 100 may be a single controller or a plurality of controllers, which may be operatively coupled to one another. As shown in FIG. 5, the controller 100 includes a memory 101 and a processor 103 configured to execute instructions (i.e. algorithmic steps) stored on the memory 101. The controller 100 may be operatively coupled (i.e. hardwired or connected wirelessly) to other components of the work machine. If hardwired, the controller 100 may be connected to the components via wires, and if connected wirelessly, the controller 100 may be connected to the components via Wi-Fi, Bluetooth, NFC, or other known means of wireless communication. Thus, the controller 100 may be positioned on the combine harvester 100 or positioned remotely, away from the combine harvester 100.

In any event, the controller 100 is configured to adjust the position of the actuator 110 based on various inputs to the controller 100 or based on data stored in the memory 101 of the controller 100. For example, the memory 101 of the controller 100 may have stored thereon various data tables including relationships between certain types of crops and various characteristics of those certain types of crops. For example, the memory 101 may have stored thereon relationships between types of corn and kernel depths thereof. As shown in FIG. 5, in some embodiments, the combine harvester 10 may include a user interface 105, which may be positioned, e.g., in the operator cab 16. The user interface 105 is operatively coupled to the controller 100 such that a user may operate the user interface 105 to input data into the memory 101 of the controller 100 or otherwise send information to the controller 100 (e.g., type of corn). As described below, in some embodiments, the user interface 105 may be used to provide an adjustment input, which is described in greater detail below, that is received by the controller 100.

Referring again to FIG. 4, in the illustrative embodiment, the actuator 110 includes a piston rod 112 and a cylinder 114. One of the piston rod 112 and the cylinder 114 is fixedly coupled to the frame 65, and the other of the piston rod 112 and the cylinder 114 is movable relative to the frame 65 and directly coupled to the bracket 108. In the illustrative embodiment, the cylinder 114 is directly coupled to the bracket 108. When actuated (e.g. linearly and laterally) the actuator 110 causes lateral movement of the bracket 108 relative to the frame 65. The bracket 108 is fixedly coupled to the rod 106 thereby causing lateral movement of the rod 106. It should be appreciated that in the illustrative embodiment, while not shown in FIG. 4, the rod 106 is coupled to a plurality of brackets, actuators, rockers, and deck plates, such that movement of the rod 106 causes simultaneous movement of a deck plate of each of the row units 64—each the same distance. In any event, in the illustrative embodiment, the rod 106 is fixedly coupled to the rocker 104. The rocker 104 is pivotably coupled at a first location to a sled 116 of the deck assembly 64 that is fixed relative to the frame 65 and pivotably coupled at a second location to the second deck plate 68. The deck second plate 68 is positioned atop the sled 116. Therefore, lateral movement of the rod 106 causes the rocker 104 to pivot about the first location and to move the second deck plate 68 laterally (opposite the direction of movement of the rod 106) either toward or away from the first deck plate 66. Thus, movement of the actuator 110 causes movement of the second deck plate 68, which causes the gap 70 between the deck plates 66, 68 to widen or barrow.

The gap 70 can be too wide or too narrow. If too wide, ears of corn can fall through the gap 70 and are lost. If the gap 70 is moderately larger than ideal (i.e., somewhat narrow such that corn cannot fall through the gap 70, but still not sufficiently narrow), butt-shelling occurs, whereby the stalk rolls 87 contact the butt end of the ear before it is separated from the stalk causing loss of kernels. Therefore it is advantageous to identify a maximum deck plate gap based on the diameter of the ears of corn to be harvested. It should be appreciated that the process described above, in which the maximum deck plate gap is identified, is especially advantageous over conventional deck plate adjustment processes when the corn has weakened or broken stalks or the stalks diameter is otherwise difficult to measure.

As shown in FIGS. 1 and 5, the combine harvester 10 includes an ear size sensor embodied as a camera 11, which in the illustrative embodiment is shown positioned on the cab 16 of the combine harvester 10. In the illustrative embodiment, the camera 11 is directed toward the corn to be harvested. As such, the camera 11 is configured to measure the diameter of ears of corn, which is shown at step 202 in FIG. 6. In other embodiments, the camera 11 may be directed toward the ears of corn during other steps in the harvesting process.

In some embodiments, the ear size sensor is embodied as a mechanical sensor 13 shown in FIG. 2. The mechanical sensor 13 may include a pair of feelers coupled to a rotational sensor. The rotational sensor and the feelers may be positioned on the nose 60. While only one pair of feelers in shown in FIG. 2, it should be appreciated that feelers may be positioned on each nose 60. As ears of corn pass between right and left feelers, the feelers move apart from one another and pivot about a center point of the rotational sensor. The degree of rotation may be measured by the rotational sensor, which corresponds to the ear diameter of the ear of corn passing between the feelers. In other embodiments, the mechanical sensor 13 may take other forms sufficient to measure the diameter of the harvested ears of corn.

Figure 6:
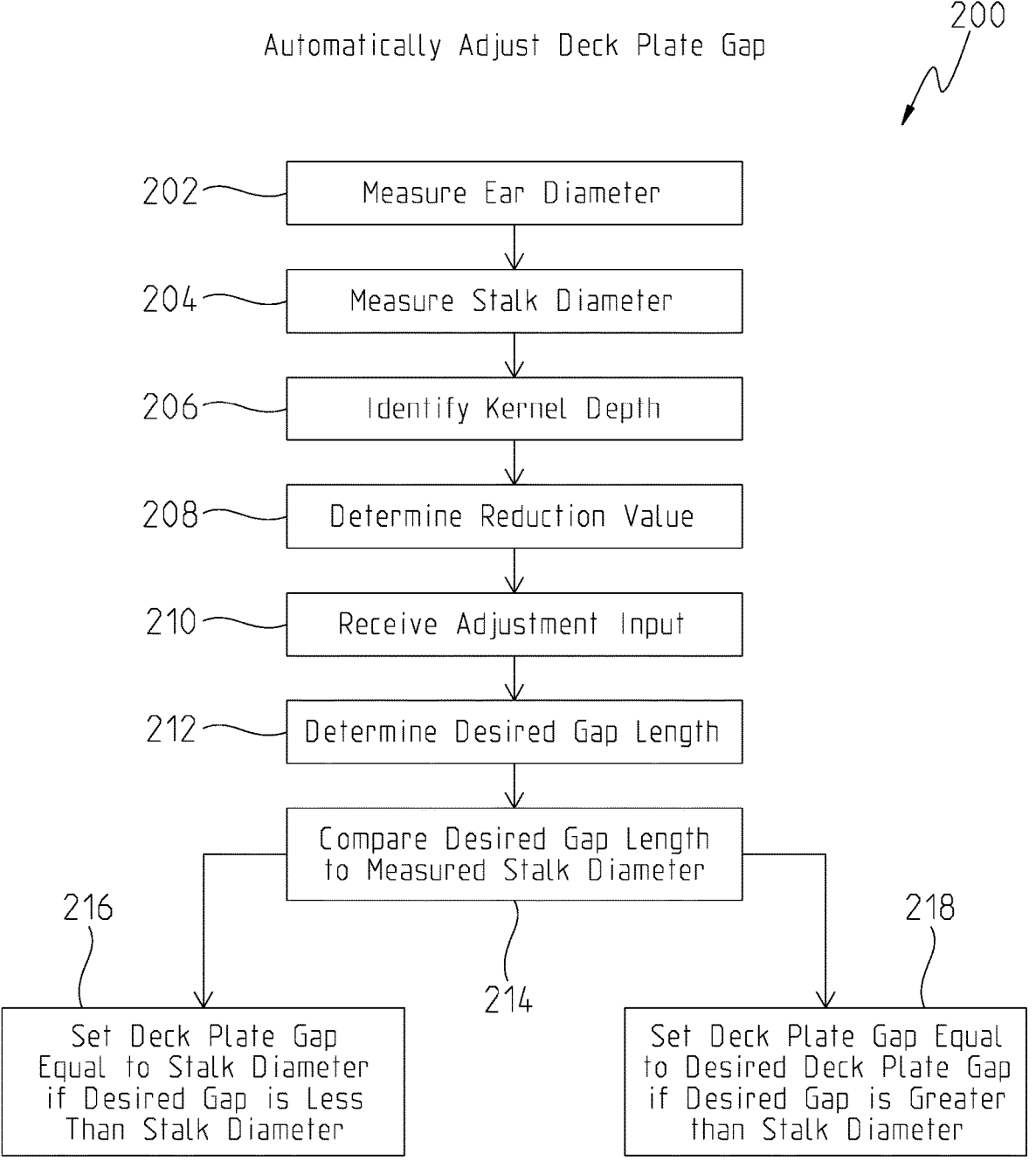
FIG. 6 illustrates a flow chart showing steps for automatically adjusting the gap between the deck plates during operation of the combine harvester.

In the illustrative embodiment, FIG. 6 shows a method of automatically adjusting the gap 70 between the deck plates 66, 68. As described in detail below, the camera 11 is also configured to measure the diameter of stalks of corn to be harvested, which is shown at step 204 in FIG. 6.

As illustrated by FIG. 5, the camera 11 is operatively coupled to the controller 100 and configured to send signals thereto indicative of the measured diameter of at least one ear of corn to be harvested. Similarly, the mechanical sensor 13 is operatively coupled to the controller 100 and configured to send signals thereto indicative of the measured diameter of at least one ear of corn. Either or both ear size sensors (i.e., camera 11 and/or mechanical sensor 13) may be used during operation of the combine harvester 10. The controller 100 is configured to adjust the position of the actuator 110 such that the gap 70 is no wider than the measured diameter of the at least one ear of corn to be harvested. In some embodiments, the controller 100 may determine a maximum deck plate gap based on an average of the measured ear diameters. In some embodiments, the controller 100 may determine the maximum deck plate gap based on the largest of the measured ear diameters. In the other embodiments, the measured ear diameter may be used in other ways to determine the maximum deck plate gap;

however, in each case, the controller 100 is configured to adjust the position of the actuator 110 such that the gap 70 is no wider than the determined value associated with the measured ear diameter.

As described above, the gap 70 between the deck plates 66, 68 may also be too narrow. If the gap 70 is too narrow, excess material such as leaves from the stalk, and other debris, such as weeds, are collected by the corn header 18, which when accumulated, wrap on the crop auger assembly 22 and prevent the corn ears from being effectively moved by the crop auger assembly 22 to the inlet transition section 30. Thus, if ear diameter is the only characteristic accounted for, then the gap 70 may be too narrow. To solve this problem, it has been discovered that kernel depth (i.e., length of a kernel of corn as it extends radially outwardly from a cob) may be used to determine a value by which the value associated with the diameter of the ear corn must be reduced to arrive at a desired gap length. This is shown at steps 206 and 208 in FIG. 6.

More specifically, as suggested by step 206 in FIG. 6, the controller 100 may be configured to multiply kernel depth by a factor of two to determine the reduction value. In some embodiments, the reduction value may be no more than twice the kernel depth. In some embodiments, as suggested by steps 200, 222, and 224 of FIG. 7, kernel depth may be multiplied by a factor of two, with the resulting value reduced or increased by an adjustment value. In some embodiments, as shown in FIG. 6 at step 210, the controller 100 receives a signal from the user interface 105 indicative of an adjustment input comprising an adjustment value and an indication of whether the gap 70 between the deck plates is too wide or too narrow. The indication of whether the gap 70 is too wide or too narrow may be referred to as a deck plate operating status. It should be appreciated that in some embodiments, the adjustment value is a predetermined value (e.g. relationship data stored on the memory 101) based on the type of corn to be harvested.

Figure 7:
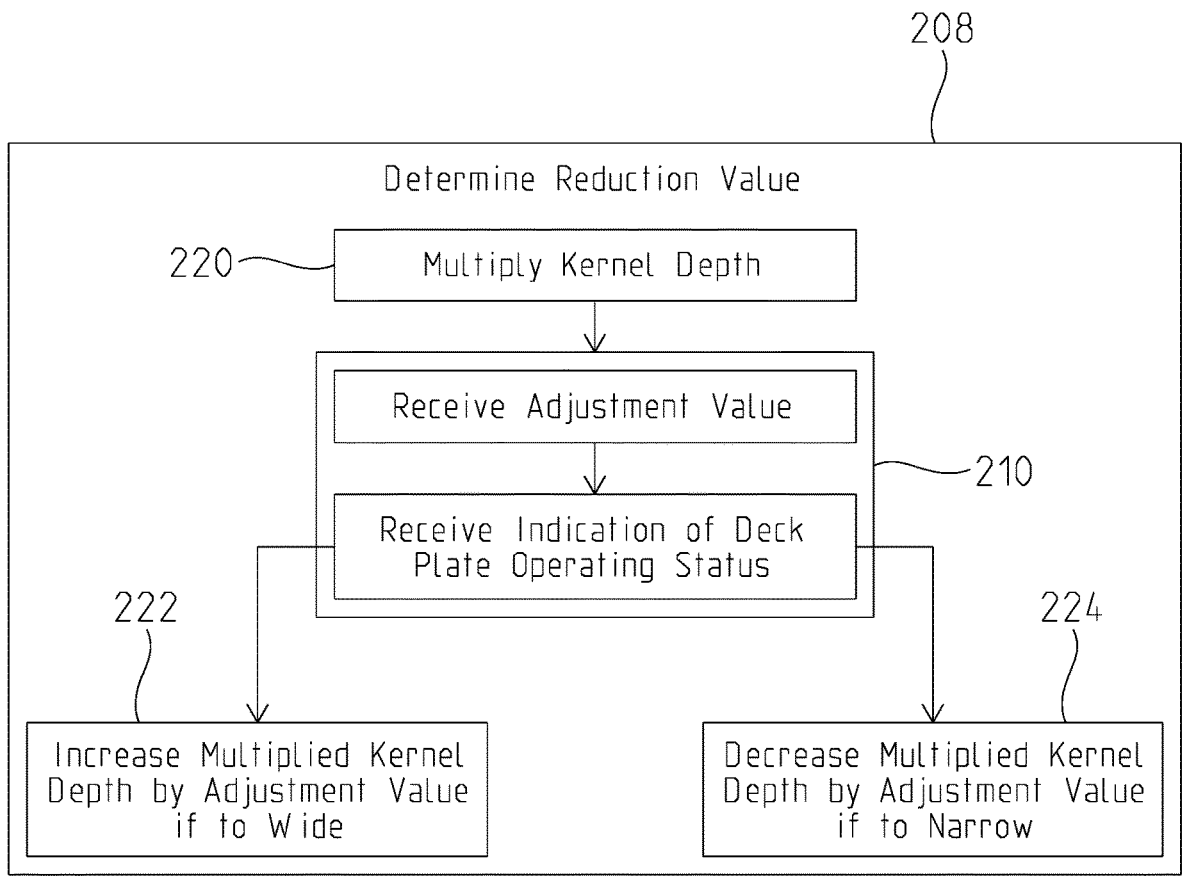
FIG. 7 illustrates a flow chart showing steps for determining a reduction value used in the method of automatically adjusting the gap between the deck plates during operation of the combine harvester.

As shown in FIG. 7 at step 222, if the adjustment input received by the controller 100 indicates that the gap 70 between the deck plates 66, 68 is too wide, then the controller 100 is configured add the adjustment value to the kernel depth multiplied by a factor of two. As shown in FIG. 5 at step 224, if the adjustment input received by the controller 100 indicates that the gap 70 between the deck plates 66, 68 is too narrow, then the controller 100 is configured subtract the adjustment value from the kernel depth multiplied by a factor of two.

While a sufficiently narrow gap 70 is desirable to prevent butt-shelling and passage of ears through the gap 70, the gap 70 must always be wide enough to allow for passage of the stalks therethrough. Therefore it is advantageous to identify the stalk diameter during operation of the combine harvester 10—e.g., via the camera 11 as described above. In some embodiments, as suggested by FIG. 5, the controller 100 is configured to receive the measured stalk diameter from the camera 11. The stalk diameter may serve as a minimum deck plate gap.

In some embodiments, the controller 100 may determine the minimum deck plate gap based on an average of the measured stalk diameters. In some embodiments, the controller 100 may determine the minimum deck plate gap based on the smallest of the measured stalk diameters. In other embodiments, the measured stalk diameter may be used in other ways to determine the minimum deck plate gap; however, in each case, the controller 100 is configured to adjust the position of the actuator 110 such that the gap 70 is no more narrow than the determined value associated with the measured stalk diameter. Specifically, in some embodiments, as shown in FIG. 6 at step 214, the controller 100 is configured to compare the desired gap length (e.g., the value determined based on at least the measured ear diameter and kernel depth) to the measured diameter of the at least one corn stalk to be harvested. As shown in FIG. 6 at step 216, if the desired gap length is less than the measured diameter of the at least one corn stalk, the controller 100 is configured to adjust the position of the actuator 110 (and thereby the second deck plate 68) such that the gap 70 between deck plates 66, 68 is equal to the measured diameter of the at least one corn stalk. As shown in FIG. 6 at step 218, if the desired gap length is greater than the measured diameter of the at least one corn stalk, the controller 100 is configured to adjust the position of the actuator 110 (and thereby the second deck plate 68) such that the gap 70 between deck plates 66, 68 is equal to the desired deck plate gap.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are initial to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A combine harvester comprising:
a corn header comprising: a frame; a first crop row divider coupled to the frame; a second crop row divider coupled to the frame and spaced from the first crop row divider to define a space therebetween; and a row unit positioned at the space, wherein the row unit includes:
a first deck plate fixed relative to the frame,
a second deck plate spaced apart from and movable relative to the first deck plate,
a gap defined between the first deck plate and the second deck plate,
at least one arm coupled to the second deck plate, and
an actuator coupled to the at least one arm;
an ear size sensor positioned on the combine harvester and configured to measure a diameter of at least one ear of corn during a harvesting operation;
a controller operatively coupled to the ear size sensor and the actuator, wherein the controller is configured to:
receive a signal from the ear size sensor indicative of the diameter of the at least one ear of corn; and
adjust the position of the actuator based on: (i) the signal from the ear size sensor indicative of the diameter of the at least one ear of corn and (ii) a kernel depth associated with the at least one ear of corn;
wherein the ear size sensor is a camera.

2. The combine harvester of claim 1, wherein the controller includes a memory including stored relationships between types of corn to be harvested and kernel depths thereof.

3. The combine harvester of claim 2, wherein the controller is configured to:
determine a reduction value based on at least the identified kernel depth; and determine a desired length for the gap which is equal to the diameter of the at least one ear of corn less the reduction value.

4. The combine harvester of claim 3, wherein the controller is configured to:
adjust the position of the actuator until the gap between the deck plates is equal to the desired length for the gap.

5. The combine harvester of claim 3, wherein the controller is configured to:
receive a signal from the ear size sensor indicative of a diameter of at least one stalk of corn during the harvesting operation;
compare the desired length for the gap to the diameter of the at least one stalk of corn; and
adjust the position of the actuator such that the gap between deck plates is equal to the measured diameter of the at least one stalk of corn if the desired length for the gap is less than the diameter of the at least one stalk of corn.

6. The combine harvester of claim 1, wherein the at least one arm is pivotably coupled to the second deck plate;
wherein the actuator is a linear actuator including a piston and a cylinder; and
wherein a first one of the piston and the cylinder is fixed relative to the frame and a second one of the piston and the cylinder is movable relative to the frame and coupled to the at least one arm.

7. A combine harvester comprising:
row unit of a corn header including:
a first deck plate,
a second deck plate movable relative to the first deck plate, and
a gap defined between the first deck plate and the second deck plate;
an actuator coupled to at least one of the first deck plate and the second deck plate to cause movement thereof;
an ear size sensor positioned on the combine harvester and configured to measure a diameter of at least one ear of corn during a harvesting operation; and
a controller operatively coupled to the ear size sensor and the actuator, wherein the controller is configured to:
receive a signal from the ear size sensor indicative of the diameter of the at least one ear of corn; and
adjust the position of the actuator based on: (i) the signal from the ear size sensor indicative of the diameter of the at least one ear of corn and (ii) a kernel depth associated with the at least one ear of corn;
wherein the ear size sensor is a camera.

8. The combine harvester of claim 7, wherein the controller includes a memory including stored relationships between types of corn for harvesting and kernel depths thereof.

9. The combine harvester of claim 8, further comprising a user interface operatively coupled to the controller;
wherein the controller is configured to receive a signal from the user interface indicative of the type of corn to be harvested.

10. The combine harvester of claim 7, wherein the controller is further configured to:
receive a signal from the ear size sensor indicative of a diameter of at least one stalk of corn during the harvesting operation; and
adjust the position of the actuator based on: (i) the signal from the ear size sensor indicative of a diameter of the at least one ear of corn, (ii) the kernel depth of the corn, and (iii) the signal from the ear size sensor indicative of a diameter of the at least one stalk of corn.

11. A method of automatically adjusting a gap between deck plates of a combine harvester comprising:

measuring, with an ear size sensor mounted on the combine harvester, a diameter of at least one ear of corn during a harvesting operation;

identifying a kernel depth that corresponds to kernels of the at least one ear of corn;

determining a reduction value based on at least the identified kernel depth;

determining a desired gap length equal to the diameter of the at least one ear of corn less the reduction value; and adjusting the position of at least one deck plate of the combine harvester such that the gap between the deck plates is equal to the desired gap length;

wherein the ear size sensor is a camera.

12. The method of claim 11, wherein the reduction value is no more than twice the kernel depth.

13. The method of claim 11, wherein identifying a kernel depth that corresponds to kernels of the at least one ear of corn to be harvested includes:

identifying the kernel depth based on stored relationships between types of corn for harvesting and kernel depths thereof.

14. The method of claim 11, further comprising:

receiving an adjustment input from a user interface, wherein the adjustment input indicates: (i) an adjustment value and (ii) that the gap between the deck plates is too wide or too narrow.

15. The method of claim 14, wherein determining a reduction value based on at least the identified kernel depth includes:

multiplying the identified kernel depth by a factor of two; and adding the adjustment value to the kernel depth multiplied by a factor of two if the received adjustment input indicates that the gap between the deck plates is too wide.

16. The method of claim 15, wherein determining a reduction value based on at least the identified kernel depth includes:

multiplying the identified kernel depth by a factor of two; and reducing the kernel depth multiplied by a factor of two by the adjustment value if the received adjustment input indicates that the gap between the deck plates is too narrow.

17. The method of claim 16, wherein the adjustment value is a predetermined value based on the type of corn.

18. The method of claim 11, further comprising:

measuring the diameter of at least one corn stalk during the harvesting operation;

comparing the desired gap length to the diameter of the at least one corn stalk; and adjusting the position of at least one deck plate of the combine harvester such that the gap between deck plates is equal to the measured diameter of the at least one corn stalk if the desired gap length is less than the diameter of the at least one corn stalk.

* * * * *